United States Patent
Chang

(10) Patent No.: US 12,013,864 B2
(45) Date of Patent: Jun. 18, 2024

(54) METHOD FOR AUTOMATICALLY GENERATING NEWS EVENTS OF A CERTAIN TOPIC AND ELECTRONIC DEVICE APPLYING THE SAME

(71) Applicant: HON HAI PRECISION INDUSTRY CO., LTD., New Taipei (TW)

(72) Inventor: Wen-Chung Chang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 318 days.

(21) Appl. No.: 17/523,078

(22) Filed: Nov. 10, 2021

(65) Prior Publication Data

US 2022/0147524 A1    May 12, 2022

(30) Foreign Application Priority Data

Nov. 10, 2020 (CN) .......................... 202011245129.0

(51) Int. Cl.
    *G06F 16/2458*     (2019.01)
    *G06F 16/28*     (2019.01)

(52) U.S. Cl.
    CPC ........ *G06F 16/2465* (2019.01); *G06F 16/285* (2019.01); *G06F 2216/03* (2013.01)

(58) Field of Classification Search
None
See application file for complete search history.

(56) References Cited

U.S. PATENT DOCUMENTS

| | | | | |
|---|---|---|---|---|
| 2010/0280985 | A1* | 11/2010 | Duchon | G06Q 10/10 706/54 |
| 2015/0248476 | A1* | 9/2015 | Weissinger | G06F 16/35 707/737 |
| 2021/0103626 | A1* | 4/2021 | Jolly | G06Q 30/0241 |
| 2021/0328888 | A1* | 10/2021 | Rath | H04L 41/5074 |

FOREIGN PATENT DOCUMENTS

CN      110852100      2/2020

\* cited by examiner

*Primary Examiner* — Amresh Singh
(74) *Attorney, Agent, or Firm* — ScienBiziP, P.C.

(57) ABSTRACT

A method for automatically generating news event of a certain topic applied in an electronic device analyzes text of the news event by a topic model to obtain topics, a probability distribution of keywords in each topic is established, and a time interval distribution of the keywords in each topic is calculated. Keywords within a preset probability distribution range are selected to reduce the size of a word bag relating to the topic, and a time interval range of the reduced word bag of the topic is determined. A calculation of text similarities of the text in a database is made to obtain a news article corresponding to each topic according to the time interval range of the reduced word bag, and a title of the news article as a target topic of the text of the news event is determined.

5 Claims, 3 Drawing Sheets

METHOD FOR AUTOMATICALLY GENERATING NEWS EVENTS OF A CERTAIN TOPIC AND ELECTRONIC DEVICE APPLYING THE SAME

CROSS-REFERENCE TO RELATED APPLICATIONS

This application claims priority to Chinese Patent Application No. 202011245129.0 filed on Nov. 10, 2020, the contents of which are incorporated by reference herein.

FIELD

The subject matter herein generally relates to a field of data mining, and especially relates to a method for automatically generating news event of a certain topic, and an electronic device.

BACKGROUND

The existing classification of text of a news event can get a variety of topics, which are in the form of a word bag comprising multiple keywords of news events. However, the keywords in the word bag of news events are difficult to be read by users because of their disorder. In the existing technology, the word bag of news events is often redefined manually to meet the requirements of readability. However, manual definition of the topic of news events is inefficient.

BRIEF DESCRIPTION OF THE DRAWINGS

Implementations of the present disclosure will now be described, by way of embodiment, with reference to the attached figures.

DETAILED DESCRIPTION

Figure 1:
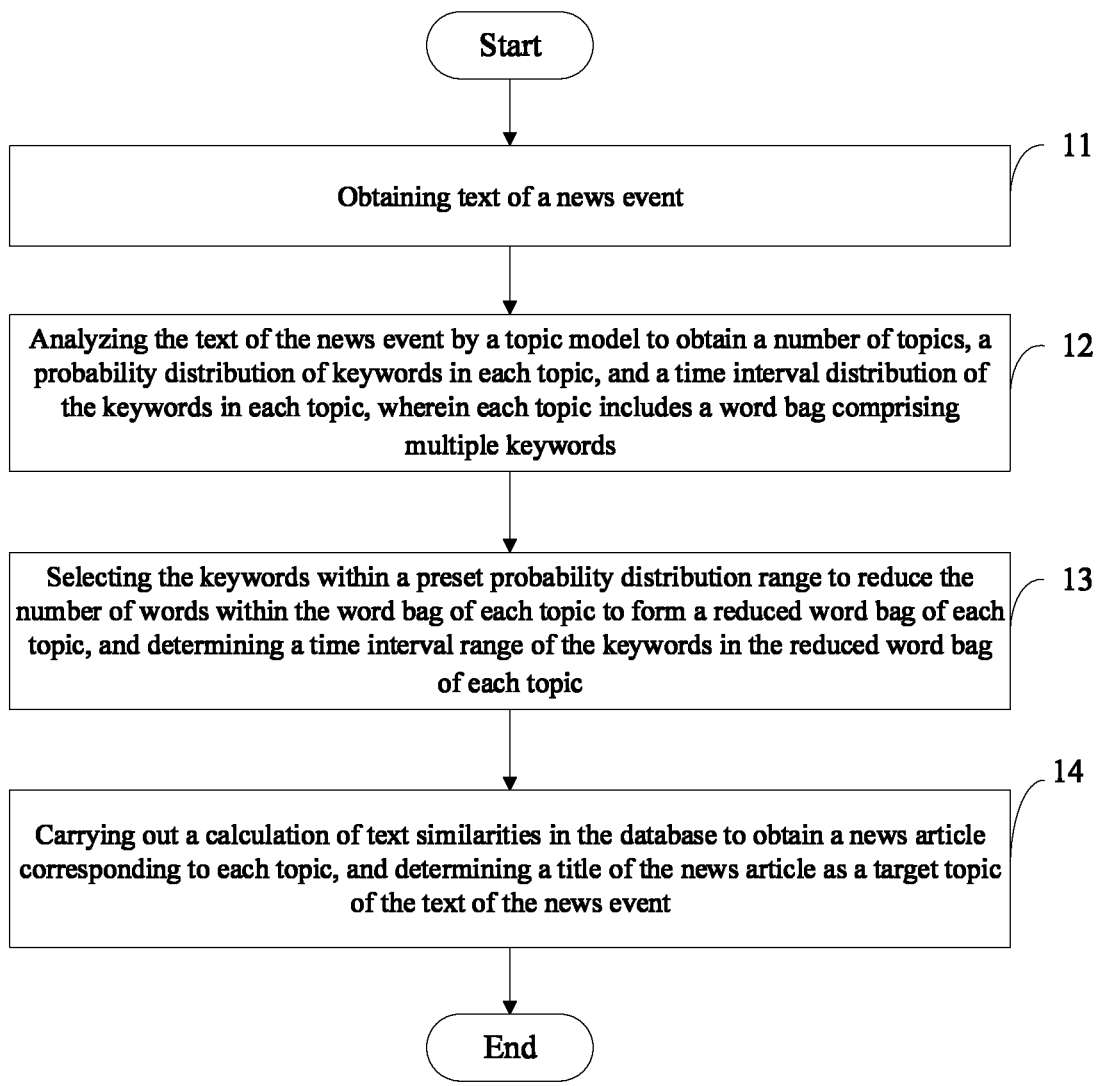
FIG. 1 is a flowchart of one embodiment of a method for automatically generating news event of a certain topic.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one".

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series, and the like.

FIG. 1 illustrates a process of a method for automatically generating news event of a certain topic. The method is applied in an electronic device (e.g., an electronic device 1 in FIG. 3). The method is provided by way of example, as there are a variety of ways to carry out the method. Each block shown in FIG. 1 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 11.

At block 11, obtaining text of a news event.

In one embodiment, the electronic device 1 obtains the text of the news event from a database of a back-end server. In another embodiment, the electronic device 1 obtains the text of the news event from the Internet. For example, the text of the news event is obtained by searching the database of the back-end server or the Internet based on target search words.

At block 12, analyzing the text of the news event by a topic model to obtain a number of topics, a probability distribution of keywords in each topic, and a time interval distribution of the keywords in each topic, wherein each topic includes a word bag comprising multiple keywords.

In one embodiment, the electronic device 1 sets a topic number of the topic model, and imports the text of the news event into the topic model. The topic model analyzes the text of the news event to obtain topics corresponding to the topic number, the probability distribution of the keywords in each topic, and the time interval distribution of the keywords in each topic by a Topic Over Time algorithm. In one embodiment, the topic model includes an implicit Dirichlet distribution topic model.

At block 13, from the word bag of each topic, selecting the keywords within a preset probability distribution range to reduce the number of words within the word bag of each topic to form a reduced word bag of each topic, and determining a time interval range of the keywords in the reduced word bag of each topic.

In one embodiment, the electronic device 1 obtains a maximum probability value of the keywords in the word bag of each topic, selects a value range between the maximum probability value of ½ and the maximum probability value as the preset probability distribution range, selects keywords within the preset probability distribution range from the word bag of each topic to form the reduced word bag of each topic, takes the keyword corresponding to the maximum probability value of ½ in the reduced word bag as a target keyword of the topic, and determines the time interval range of the reduced word bag according to the time interval of the target keyword.

In one embodiment, the probability distribution of the keywords in each topic is a normal distribution. The number of the target keywords with maximum probability value of ½ in the word bag of the topic is two. The time period corresponding to the time interval between two target keywords in the word bag of each topic is determined as the time interval range of the reduced bag of words.

At block 14, according to the time interval range of the reduced word bag and the reduced word bag of each topic, carrying out a calculation of text similarities in the database (similarity calculation) to obtain a news article corresponding to each topic, and determining a title of the news article as a target topic of the text of the news event.

In the present disclosure, the electronic device 1 analyzes the text of the news event by a topic model to obtain a number of topics, carries out the similarity calculation to obtain the news article corresponding to each topic according to the time interval range of the reduced word bag and the reduced word bag of each topic, and determines a title of the news article as a target topic of the text of the news event. Thereby, the topic of text of a news event is automatically generated, improving the efficiency of generating topic of text of a news event, and meeting the requirements of topic readability.

Figure 2:
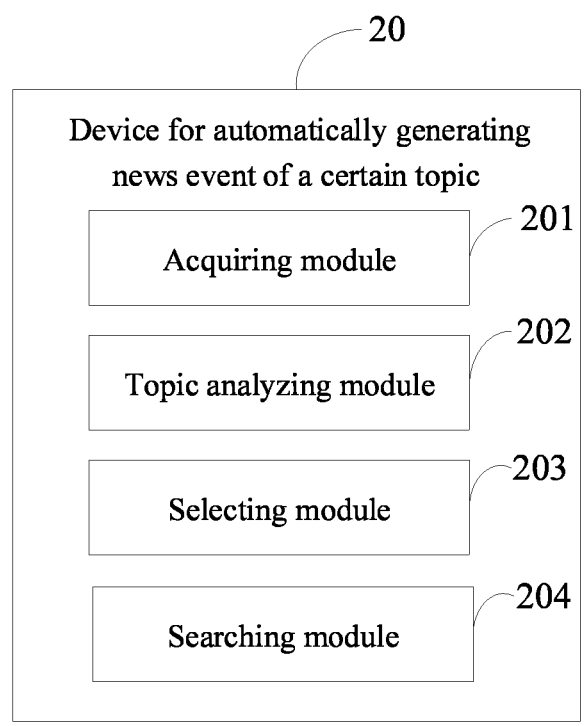
FIG. 2 is a block diagram of one embodiment of a device for automatically generating news event of a certain topic.

FIG. 2 illustrates a device 20 for automatically generating news event of a certain topic. The device 20 is applied in the electronic device 1. In one embodiment, according to the functions it performs, the device 20 can be divided into a plurality of functional modules. The functional modules perform the blocks 11-14 in the embodiment of FIG. 1. The device 20 includes, but is not limited to, an acquiring module 201, a topic analyzing module 202, a selecting module 203, and a searching module 204. The modules 201-204 of the device 20 can be collections of software instructions. In one embodiment, the program code of each program segment in the software instructions can be stored in a storage device and executed by at least one processor to perform the required functions.

The acquiring module 201 obtains the text of the news event.

In one embodiment, the acquiring module 201 obtains the text of the news event from a database of a back-end server. In another embodiment, the acquiring module 201 obtains the text of the news event from the Internet. For example, the text of the news event content is obtained by searching the database of the back-end server or the Internet based on target search words.

The topic analyzing module 202 analyzes the text of the news event by a topic model to obtain a number of topics, a probability distribution of the keywords in each topic, and a time interval distribution of the keywords in each topic, wherein each topic includes or carries with it a word bag comprising multiple keywords.

In one embodiment, the topic analyzing module 202 sets a topic number of the topic model, and imports the text of the news event into the topic model. The topic model analyzes the text of the news event to obtain topics corresponding to the topic number, the probability distribution of the keywords in each topic, and the time interval distribution of the keywords in each topic by a Topic Over Time algorithm. In one embodiment, the topic model includes an implicit Dirichlet distribution topic model.

The selecting module 203 selects the keywords within a preset probability distribution range to reduce the number of words within the word bag of each topic to form a word bag with a reduced number of keywords from the word bag of each topic, and determines a time interval range of the keywords in the reduced word bag of each topic according to the time interval of the key words of the reduced word bag of each topic.

In one embodiment, the selecting module 203 obtains a maximum probability value of the keywords in the word bag of each topic, selects a value range between the maximum probability value of ½ and the maximum probability value as the preset probability distribution range, selects the keywords within the preset probability distribution range from the word bag of each topic to form the reduced word bag of the topic, takes the keyword corresponding to the maximum probability value of ½ in the reduced word bag as a target keyword of the topic, and determines the time interval range of the reduced word bag according to the time interval of the target keyword.

In one embodiment, the probability distribution of the keywords in each topic is a normal distribution. The number of the target keywords with maximum probability value of ½ in the word bag of the topic is two. The time period corresponding to the time interval between two target keywords in the word bag of each topic is determined as the time interval range of the reduced bag.

According to the time interval range of the reduced word bag and the reduced word bag of each topic, the searching module 204 carries out a calculation of text similarities in the database to obtain a news article corresponding to each topic, and determines a title of the news article as a target topic of the text of the news event.

Figure 3:
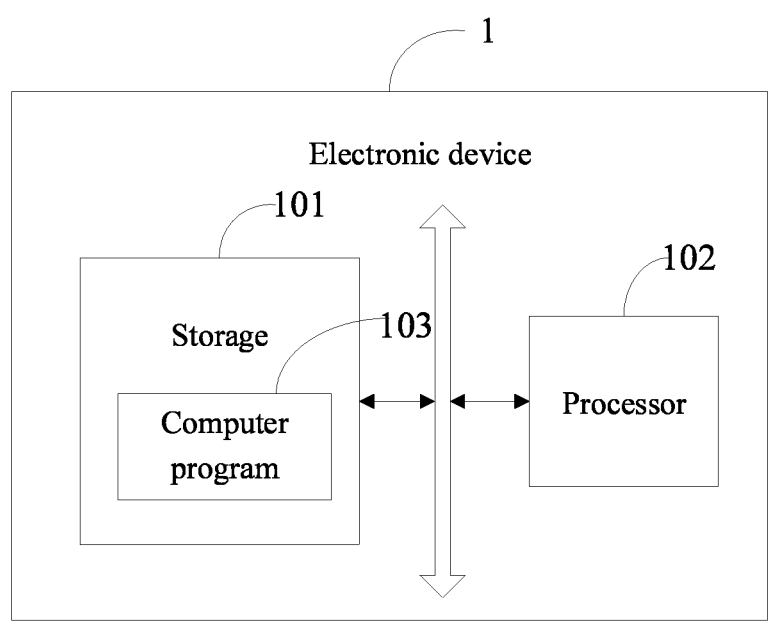
FIG. 3 is a schematic diagram of one embodiment of an electronic device.

FIG. 3 illustrates the electronic device 1. The electronic device 1 includes a storage 101, a processor 102, and a computer program 103 stored in the storage 101 and executed by the processor 102. When the processor 102 executes the computer program 103, the blocks in the embodiment of the method for automatically generating news event of a certain topic, for example, blocks 11 to 14 as shown in FIG. 1. Alternatively, when the processor 102 executes the computer program 103, the functions of the modules in the embodiment of the device 20 for automatically generating news event of a certain topic are implemented, for example, modules 201-204 shown in FIG. 2.

In one embodiment, the computer program 103 can be partitioned into one or more modules/units that are stored in the device 20 and executed by the processor 102. The one or more modules/units may be a series of computer program instruction segments capable of performing a particular function, and the instruction segments describe the execution of the computer program 103 in the electronic device 1. For example, the computer program 103 can be divided into the acquiring module 201, the topic analyzing module 202, the selecting module 203, and the searching module 204, as shown in FIG. 2.

In one embodiment, the electronic device 1 can be a computing device such as a desktop computer, a notebook, a handheld computer, or a cloud terminal device. FIG. 3 shows only one example of the electronic device 1. There are no limitations of the electronic device 1, and other examples may include more or less components than those illustrated, or some components may be combined, or have a different arrangement. The components of the electronic device 1 may also include input devices, output devices, communication units, network access devices, buses, and the like.

The processor 102 can be a central processing unit (CPU), and also include other general-purpose processors, a digital signal processor (DSP), and application specific integrated circuit (ASIC), Field-Programmable Gate Array (FPGA) or other programmable logic device, discrete gate or transistor logic device, discrete hardware components, etc. The processor 102 may be a microprocessor or the processor may be any conventional processor or the like. The processor 102 is the control center of the electronic device 1, and connects the electronic device 1 by using various interfaces and lines.

The storage 101 can be used to store the computer program 103, modules or units, and the processor 102 can realize various functions of the electronic device 1 by running or executing the computer program, modules, or units stored in the storage 101 and calling up the data stored in the storage 101.

In one embodiment, the storage 101 may mainly include a program storage area and a data storage area, wherein the program storage area may store an operating system, an application program (such as a sound playback function, an image playing function, etc.) required for at least one function, etc. The data storage area can store data (such as audio data, address or telephone numbers book, etc.) created according to the use of the electronic device 1. In addition, the storage 101 may include random access memory, and may also include a non-volatile memory, such as a hard disk, an internal memory, a plug-in hard disk, a smart media card (SMC), a secure digital (SD) card, a flash card, at least one disk storage device, a flash memory device, or other volatile storage device.

In one embodiment, the modules/units integrated in the electronic device 1 can be stored in a computer readable storage medium if such modules/units are implemented in the form of a product. Thus, the present disclosure may be implemented and realized in any part of the method of the foregoing embodiments, or may be implemented by the computer program, which may be stored in the computer readable storage medium. The steps of the various method embodiments described above may be implemented by a computer program when executed by a processor. The computer program includes computer program code, which may be in the form of source code, object code form, executable file, or some intermediate form. The computer readable medium may include any entity or device capable of carrying the computer program code, a recording medium, a USB flash drive, a removable hard disk, a magnetic disk, an optical disk, a computer memory, a read-only memory (ROM), random access memory (RAM), electrical carrier signals, telecommunication signals, and software distribution media.

The exemplary embodiments shown and described above are only examples. Even though numerous characteristics and advantages of the present disclosure have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims.

What is claimed is:

1. A method for automatically generating news event of a certain topic comprising:

obtaining text of a news event;

analyzing the text of the news event by a topic model to obtain a plurality of topics, a probability distribution of keywords in each of the topics, and a time interval distribution of the keywords in each of the topics, comprising: setting a topic number of the topic model, and importing the text of the news event into the topic model; and by an implicit Dirichlet distribution topic model, analyzing the text of the news event to obtain topics corresponding to the topic number, the probability distribution of the keywords in each of the topics, and the time interval distribution of the keywords in each of the topics, wherein each of the topics comprises a word bag comprising multiple keywords;

from the word bag of each of the topics, selecting keywords within a preset probability distribution range to form a reduced word bag of each of the topics, and determining a time interval range of the keywords in the reduced word bag of each of the topics according to a time interval of the keywords of the reduced word bag of each of the topics, comprising: obtaining a maximum probability value of the keywords in the word bag of each of the topics; selecting a value range between the maximum probability value of ½ and the maximum probability value as the preset probability distribution range; selecting the keywords within the preset probability distribution range from the word bag of each of the topics to form the reduced word bag of each of the topics; taking the keyword corresponding to the maximum probability value of ½ in the reduced word bag as a target keyword of each of the topics, and determining the time interval range of the reduced word bag according to a time interval of the target keyword, wherein the probability distribution of the keywords in each of the topics is a normal distribution, and the number of the target keywords with the maximum probability value of ½ in the word bag of the topic is two, and a time period corresponding to a time interval between two target keywords in the word bag of each of the topics is the time interval range of the reduced word bag; and according to the time interval range of the reduced word bag and the reduced word bag of each of the topics, carrying out a calculation of text similarities in a database to obtain a news article corresponding to each of the topics, and determining a title of the news article as a target topic of the text of the news event.

2. The method as recited in claim 1, further comprising: obtaining the text of the news event from a database of a back-end server.

3. An electronic device comprising:

a processor; and a non-transitory storage medium coupled to the processor and configured to store a plurality of instructions, which cause the processor to:

obtain text of a news event;

analyze the text of the news event by a topic model to obtain a plurality of topics, a probability distribution of keywords in each of the topics, and a time interval distribution of the keywords in each of the topics, comprising: setting a topic number of the topic model, and importing the text of the news event into the topic model; and by an implicit Dirichlet distribution topic model, analyzing the text of the news event to obtain topics corresponding to the topic number, the probability distribution of the keywords in each of the topics, and the time interval distribution of the keywords in each of the topics, wherein each of the topics comprises a word bag comprising multiple keywords;

select keywords within a preset probability distribution range to form a reduced word bag of the topic from the word bag of each of the topics, and determine a time interval range of the reduced word bag of each of the topics according to a time interval of the key words of the reduced word bag of each of the topics, comprising: obtaining a maximum probability value of the keywords in the word bag of each of the topics; selecting a value range between the maximum probability value of ½ and the maximum probability value as the preset probability distribution range; selecting the keywords within the preset probability distribution range from the word bag of each of the topics to form the reduced word bag of each of the topics; taking the keyword corresponding to the maximum probability value of ½ in the reduced word bag as a target keyword of each of the topics, and determining the time interval range of the reduced word bag according to a time interval of the target keyword, wherein the probability distribution of the keywords in each of the topics is a normal distribution, and the number of the target keywords with the maximum probability value of ½ in the word bag of the topic is two, and a time period corresponding to a time interval between two target keywords in the word bag of each of the topics is the time interval range of the reduced word bag;

carry out a calculation of text similarities in a database to obtain a news article corresponding to each of the topics according to the time interval range of the reduced word bag and the reduced word bag of each of the topics, and determine a title of the news article as a target topic of the text of the news event.

4. The electronic device as recited in claim 3, wherein the plurality of instructions are further configured to cause the processor to:

obtain the text of the news event from a database of a back-end server.

5. A non-transitory storage medium having stored thereon instructions that, when executed by at least one processor of an electronic device, causes the least one processor to execute instructions of a method for automatically generating news event of a certain topic, the method comprising:

obtaining text of a news event;

analyzing the text of the news event by a topic model to obtain a plurality of topics, a probability distribution of keywords in each of the topics, and a time interval distribution of the keywords in each of the topics, comprising: setting a topic number of the topic model, and importing the text of the news event into the topic model; and by an implicit Dirichlet distribution topic model, analyzing the text of the news event to obtain topics corresponding to the topic number, the probability distribution of the keywords in each of the topics, and the time interval distribution of the keywords in each of the topics, wherein each of the topics comprises a word bag comprising multiple keywords;

from the word bag of each of the topics, selecting keywords within a preset probability distribution range to form a reduced word bag of each of the topics, and determining a time interval range of the keywords in the reduced word bag of each of the topics according to a time interval of the keywords of the reduced word bag of each of the topics, comprising: obtaining a maximum probability value of the keywords in the word bag of each of the topics; selecting a value range between the maximum probability value of ½ and the maximum probability value as the preset probability distribution range; selecting the keywords within the preset probability distribution range from the word bag of each of the topics to form the reduced word bag of each of the topics; taking the keyword corresponding to the maximum probability value of ½ in the reduced word bag as a target keyword of each of the topics, and determining the time interval range of the reduced word bag according to a time interval of the target keyword, wherein the probability distribution of the keywords in each of the topics is a normal distribution, and the number of the target keywords with the maximum probability value of ½ in the word bag of the topic is two, and a time period corresponding to a time interval between two target keywords in the word bag of each of the topics is the time interval range of the reduced word bag; and according to the time interval range of the reduced word bag and the reduced word bag of each of the topics, carrying out a calculation of text similarities in a database to obtain a news article corresponding to each of the topics, and determining a title of the news article as a target topic of the text of the news event.

\* \* \* \* \*